United States Patent
Pace, Jr. et al.

(10) Patent No.: US 10,855,842 B1
(45) Date of Patent: Dec. 1, 2020

(54) MECHANISMS FOR SCHEDULING OUTBOUND CALLS FROM CALL CENTERS

(71) Applicant: United Services Automobile Association (USAA), San Antonio, TX (US)

(72) Inventors: Robert B. Pace, Jr., San Antonio, TX (US); Chee Chiang Verzosa Puen, Jr., San Antonio, TX (US); Oscar Roberto Tijerina, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/367,369

(22) Filed: Mar. 28, 2019

Related U.S. Application Data

(60) Provisional application No. 62/650,754, filed on Mar. 30, 2018.

(51) Int. Cl.
| | |
|---|---|
| *H04M 3/00* | (2006.01) |
| *H04M 3/48* | (2006.01) |
| *H04M 3/42* | (2006.01) |
| *H04M 3/432* | (2006.01) |
| *H04M 3/436* | (2006.01) |
| *H04M 1/725* | (2006.01) |
| *G06F 21/32* | (2013.01) |

(52) U.S. Cl.
CPC .......... *H04M 3/48* (2013.01); *H04M 3/42374* (2013.01); *H04M 3/432* (2013.01); *H04M 3/4365* (2013.01); *G06F 21/32* (2013.01); *H04M 1/72583* (2013.01)

(58) Field of Classification Search
USPC ............. 379/210.01, 266.07, 265.02, 265.09
See application file for complete search history.

(56) References Cited

U.S. PATENT DOCUMENTS

| | | | | |
|---|---|---|---|---|
| 2012/0288075 | A1* | 11/2012 | Williams ............... | G06Q 10/02 379/93.17 |
| 2014/0044254 | A1* | 2/2014 | Chinnappa .......... | H04M 3/5231 379/265.12 |
| 2017/0195485 | A1* | 7/2017 | Ananthakrishnan ........................ | H04M 7/0027 |
| 2017/0303129 | A1* | 10/2017 | Boettcher .......... | H04M 1/7253 |
| 2018/0309801 | A1* | 10/2018 | Rathod ................... | H04L 51/04 |

* cited by examiner

*Primary Examiner* — Rasha S Al Aubaidi
(74) *Attorney, Agent, or Firm* — Fish & Richardson P.C.

(57) ABSTRACT

Communications channels between systems can be managed such that unnecessary use of the channels is limited. A computer system can initiate a request to establish communications channels between a client device and the computer system. A notification is sent to the client device, which causes the client device to prompt the user to either accept the request or reschedule the requested establishing of the communications channel.

20 Claims, 9 Drawing Sheets

MECHANISMS FOR SCHEDULING OUTBOUND CALLS FROM CALL CENTERS

CROSS-REFERENCE TO RELATED APPLICATION

This application claims priority under 35 U.S.C. § 119 to U.S. Application Ser. No. 62/650,754, filed on Mar. 30, 2018, the entire contents of which is incorporated by reference herein.

TECHNICAL FIELD

The present disclosure generally relates to systems and methods for managing the establishment of communication channels between systems.

BACKGROUND

A call center is a centralized office used for receiving or transmitting a large volume of requests by telephone. An inbound call center is operated by a company to administer incoming product support or information inquiries from customers.

An organization may use any number of computing systems, communications networks, data storage devices, or other types of systems to provide service to individuals. An organization may also employ service representatives that use the various systems to assist individuals in service sessions that are conducted over the telephone, in a video conference, through text chat sessions, in person, and/or over other communication channels.

SUMMARY

The disclosure describes systems and methods for managing the establishment of communications channels between computing devices. A computer system (e.g., operated by a customer service representative) initiates a request to establish a communications channel between the computer system and a client device (e.g., a mobile device). A notification relating to the request is broadcasted to the client device. Upon receiving the notification, a user of the client device can, using the client device, either accept the request to establish the communications channel or schedule the establishment of the communications channel for another time.

In general, innovative aspects of the subject matter described in this specification can be embodied in methods, computer systems, and computer program products.

In at least one aspect of the present disclosure, a computer-implemented method for managing communications channels is provided. The method includes initiating, by a computer system, a request to establish a communications channel between the computer system and a client device. The method includes broadcasting, in response to the initiation of the request, a notification to the client device that when received by the client device causes the client device to render a graphical user interface with a first visual representation and second visual representation. The first visual representation prompts a user of the client device to accept the request to establish the communications channel and the second visual representation prompts the user to schedule the establishing of the communications channel for another time. The first graphical user interface prompts the user of the client device to select the first or second visual representations. The method includes establishing, when the computer system receives selection data specifying that the user of the client device selects the first visual representation, the communications channel between the computer system and the client device. The method includes causing, when the computer system receives selection data specifying that the user of the client device selects the second visual representation, display of one or more third visual representations that prompt the user of the client device to select a time in which the establishing of the communications channel is scheduled.

Broadcasting the notification to the client device can include broadcasting the notification to a mobile application on the client device. The notification can include a push notification. Establishing the communications channel between the computer system and the client device can include authenticating the user of the client device. Authenticating the user of the client device can include prompting the user of the client device to submit, through the client device, one or more types of biometric data. The communications channel can include a voice over internet protocol communication channel.

In at least one other aspect of the present disclosure, a method for allowing a user of a client device to accept or schedule a call is provided. The method includes the acts of receiving, on a smart device of a customer, a notification that a representative of an entity would like to talk to the customer. The method may include the acts of displaying, on the smart device, a user interface that enables the user to accept the call or schedule the call for another time.

The method can include the acts of authenticating the customer using biometric data and connecting the representative to the customer. The method can include enabling the customer to set a time for the call and notifying a computer system of the entity of the time. At the time, the customer can be notified of the schedule call. At the time, an available representative can be notified of the scheduled call.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon, which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon, which, when executed by the one or more processors, cause the one or more processors to perform operations in accordance with implementations of the methods provided herein.

Implementations of the present disclosure provide one or more of the following advantages. By using the notifications, a Representative can comfortably query the availability of a member (user), and receive real-time feedback as to if/when the Member will be available. Thus, the Representative does not have to initiate a call and unnecessarily burden the data capabilities of the communications channel when the Member is not available. Additionally, if the Member chooses to connect to a Representative this way, the Member can be authenticated before the communications channel is established. This can add important security measures to the communications channel and the computer system that the representative is operating.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

A company may need to reach out and contact a customer directly. For example, a financial institution may be concerned about fraud, the customer may have a lapsed payment method, or the customer may have exceeded a credit limit. For a retail institution, there may be an issue with an order. More generally, the customer may need to be informed about a corporate decision, or an update to an existing matter (for example, the processing of an insurance claim).

Figure 1:
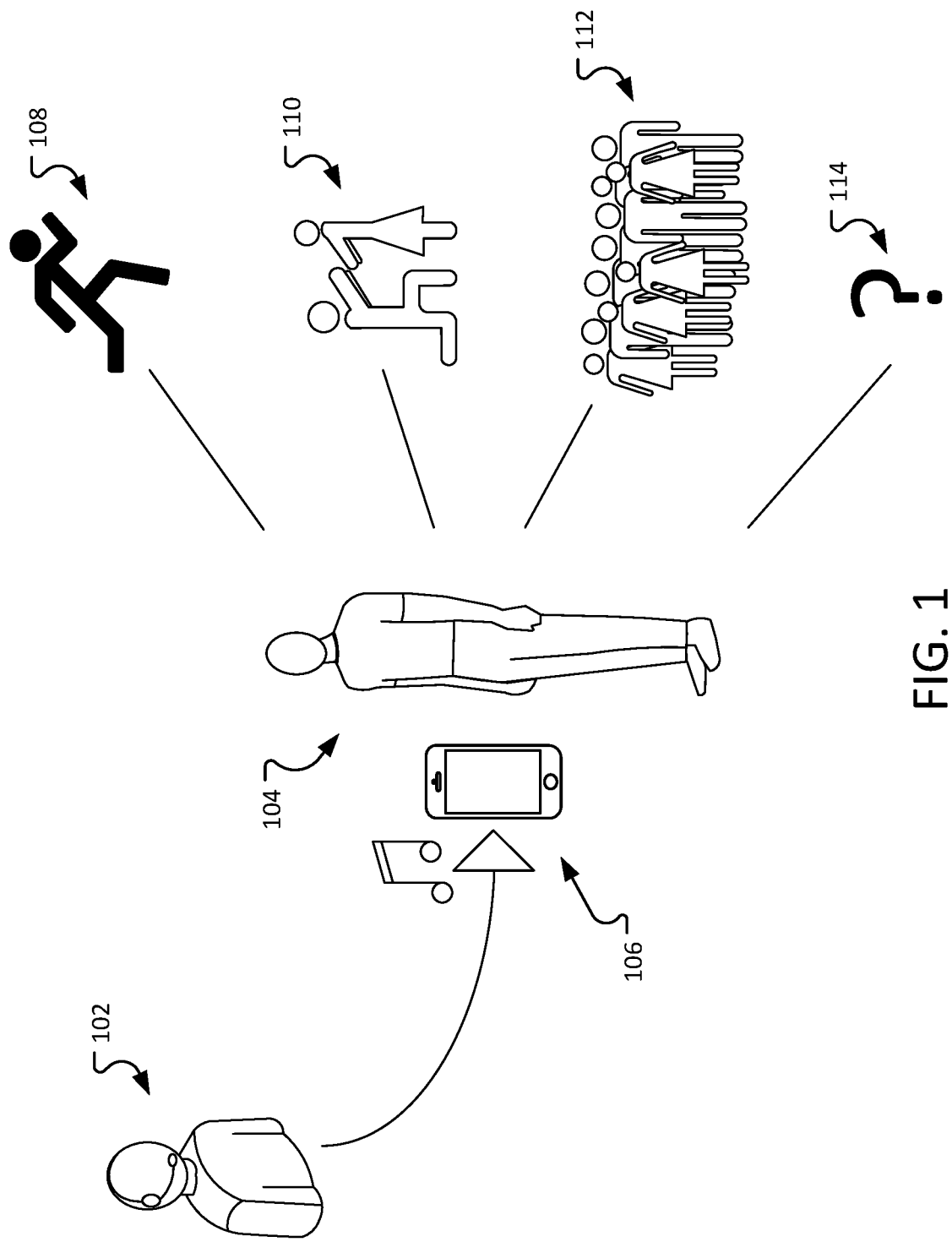
FIG. 1 illustrates an example of a representative of a company contacting a customer.

FIG. 1 illustrates an example of a representative 102 of a company contacting a customer 104. The representative 102 may attempt to call the customer's mobile phone 106. The customer 104 may be using, for example, a smart phone, or similar device. The smart phone may include the ability to execute applications (apps), for example, an app provided by and/or generally associated with the company.

When receiving the call, there are many reasons why a customer may not wish to or may not be able to answer the call. The customer 104 may be away 108 from his phone, or his phone may be away from a service area (e.g. a remote area or the phone may be set to airplane mode). The customer 104 may be engaged in an activity 110 he does not wish to interrupt. The customer 104 may be in a crowded environment 112 with little privacy. Or the customer 104 may not recognize the number and be unwilling to take a call from an unknown caller.

The customer 104 may later receive a voice message and may or may not return the company's call. If the customer calls back, he will frequently be in contact with a different representative, potentially from a different department, that is unaware of the reason for the call. In addition to being time consuming and wasteful, this can contribute to a poor customer experience.

Figure 2:
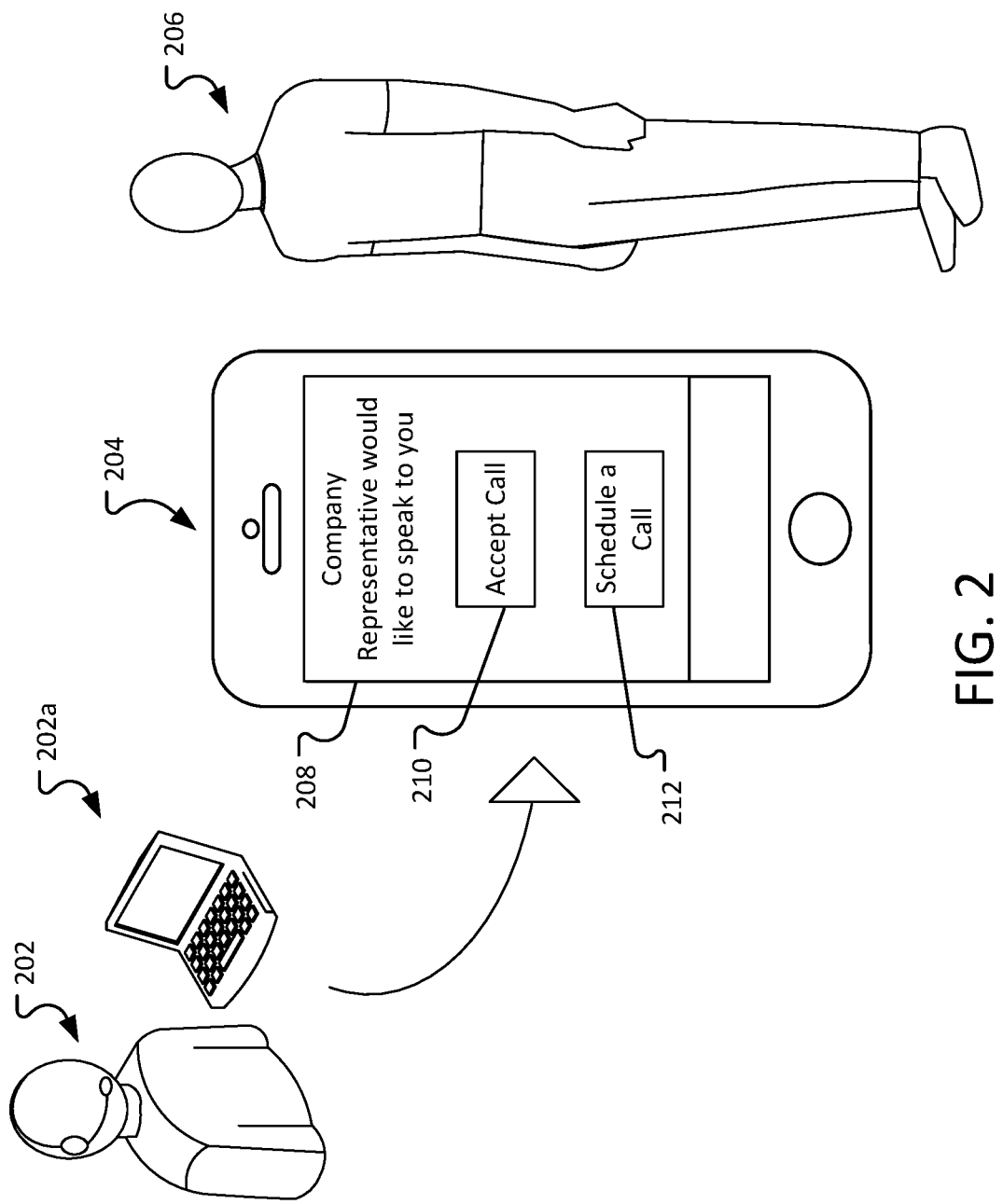
FIG. 2 illustrates an example of a representative sending a notification to a user.

One mechanism that can enhance the customer experience and reduce the amount of wasted resources can include sending a notification to a customer to which the customer can respond. For example, a representative may select a button or other user interface element from a portal which causes the notification to be sent to the customer. FIG. 2 illustrates an example of a representative sending a notification to a user. In some implementations, the representative 202 sends a notification 208 to a customer 206. In some implementations, the representative 202 sends the notification using a computer system 202a. The notification 208 may be sent, for example, to a smart phone 204 or similar device (such as a smart watch) associated with the customer 206.

In some implementations, the notification indicates that the representative 202 of the company wishes to speak to the customer 206 (e.g., by establishing a communications channel between the computer system 202a and the smart device 204). In some implementations, the notification 208 includes the name of the representative 202. The notification 208 can present the customer 206 with different options. In this example, the customer 206 is capable of accepting the call by pressing the accept call button 210. The customer 206 is also capable of scheduling a call for a different time by, for example, pressing the schedule a call button 212.

In some implementations, the notification 208 includes a reference number or other information that can be used by a customer service representative 202 to identify the reason for the call (e.g., an incident report number). The notification 208 can also include a callback number that the smart device 204 can use to contact the representative directly.

In some implementations, if the customer 206 does not respond to the notification 208 within a period of time (e.g., 5 minutes), the representative 202, or a computer system 202a of the representative, sends a notification that deletes the previous notification 208 (as the representative is no longer available to talk). In some implementations, the second notification may delete the previous notification 208 and replace it with a new notification that only allows the customer 206 to schedule a follow up call at another time (as discussed in more detail below.)

Figure 3:
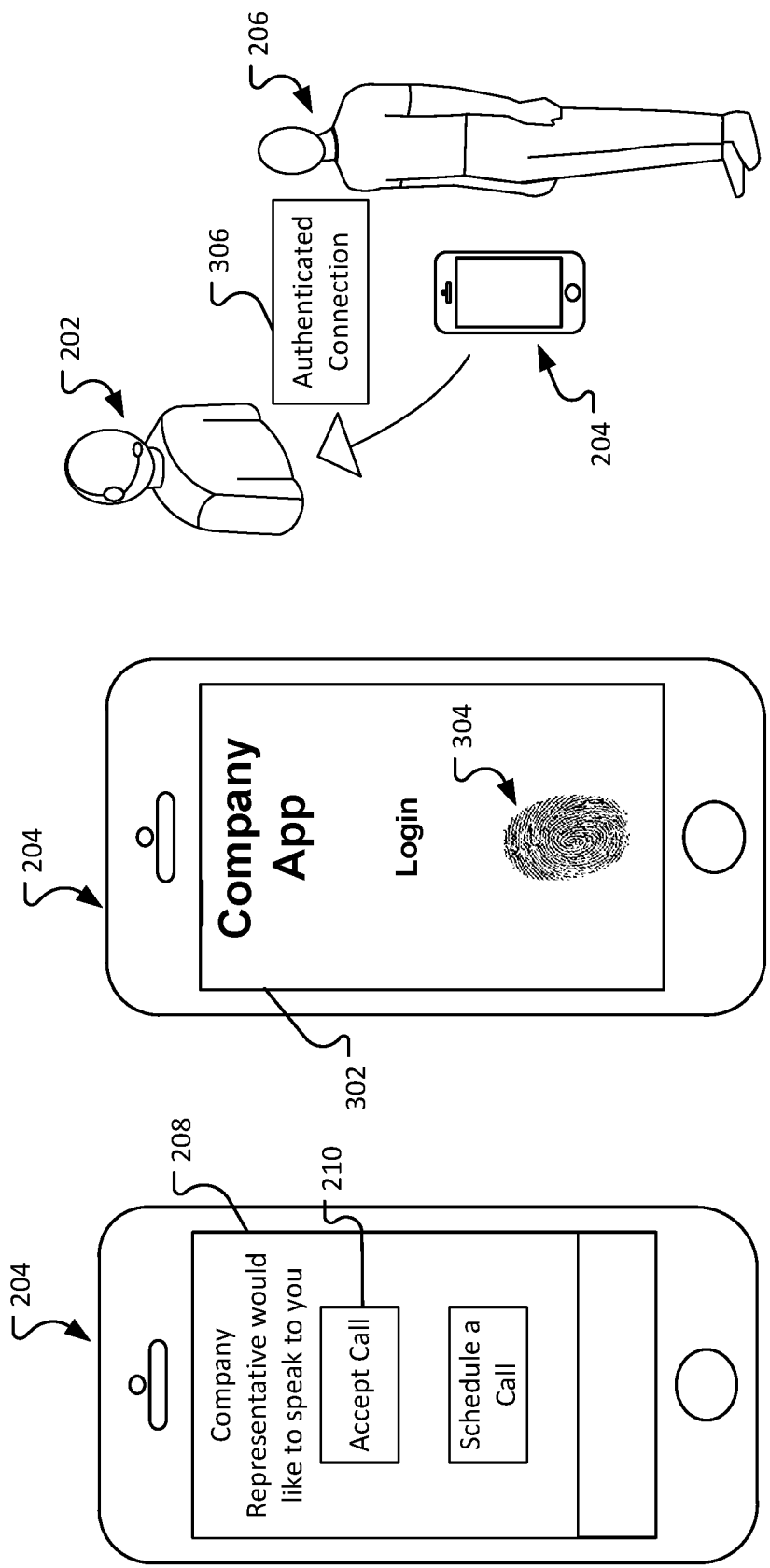
FIGS. 3A-C illustrate an example of a customer accepting a call in response to a notification.

FIGS. 3A-C illustrate an example of a customer accepting a call in response to a notification. Referring to FIG. 3A, the customer receives the notification 208 on their smart device 204. The customer selected the accept call button 210.

Referring to FIG. 3B, in response to the customer selecting the accept call button 210 of FIG. 3A, the user interface of an app on the smart device 204 displays an authentication screen 302. In this example, the authentication screen 302 prompts the customer 206 to provide at least one biometric 304 (for example, a finger print). Other forms of authentication can also be used, for example, the system can authenticate the customer 206 using facial recognition or other biometrics. The system can also authenticate the customer 206 using a username and password, pin code, or other similar mechanism.

Referring to FIG. 3C, once the user/customer 206 is authenticated, the smart device 204 places a call to the representative 202 waiting for the customer's 206 call. Thus, a communications channel between the representative 202 (e.g., through the representative's 202 computer system 202a) and the customer 206 (e.g., through the customer's smart device 204) is established. The call may be placed using a voice over IP (VOIP) connection through the app on the smart device 204. Because the customer 206 has already been authenticated by the app of the smart device 302, the customer 206 may be pre-authenticated 306 for the communication with the representative 202. In this manner, the representative 202 does not need to ask the customer 206 additional questions to verify his identity. As described above, the call information may be provided to the smart device 204 as part of the original notification 208. Alternatively, an app executing on the smart device 204 may contact the call center (for example, using a secure connection over a wireless network) to obtain the call information for the representative 202, for example, by providing an incident report ID and receiving the phone number in exchange.

Figure 4:
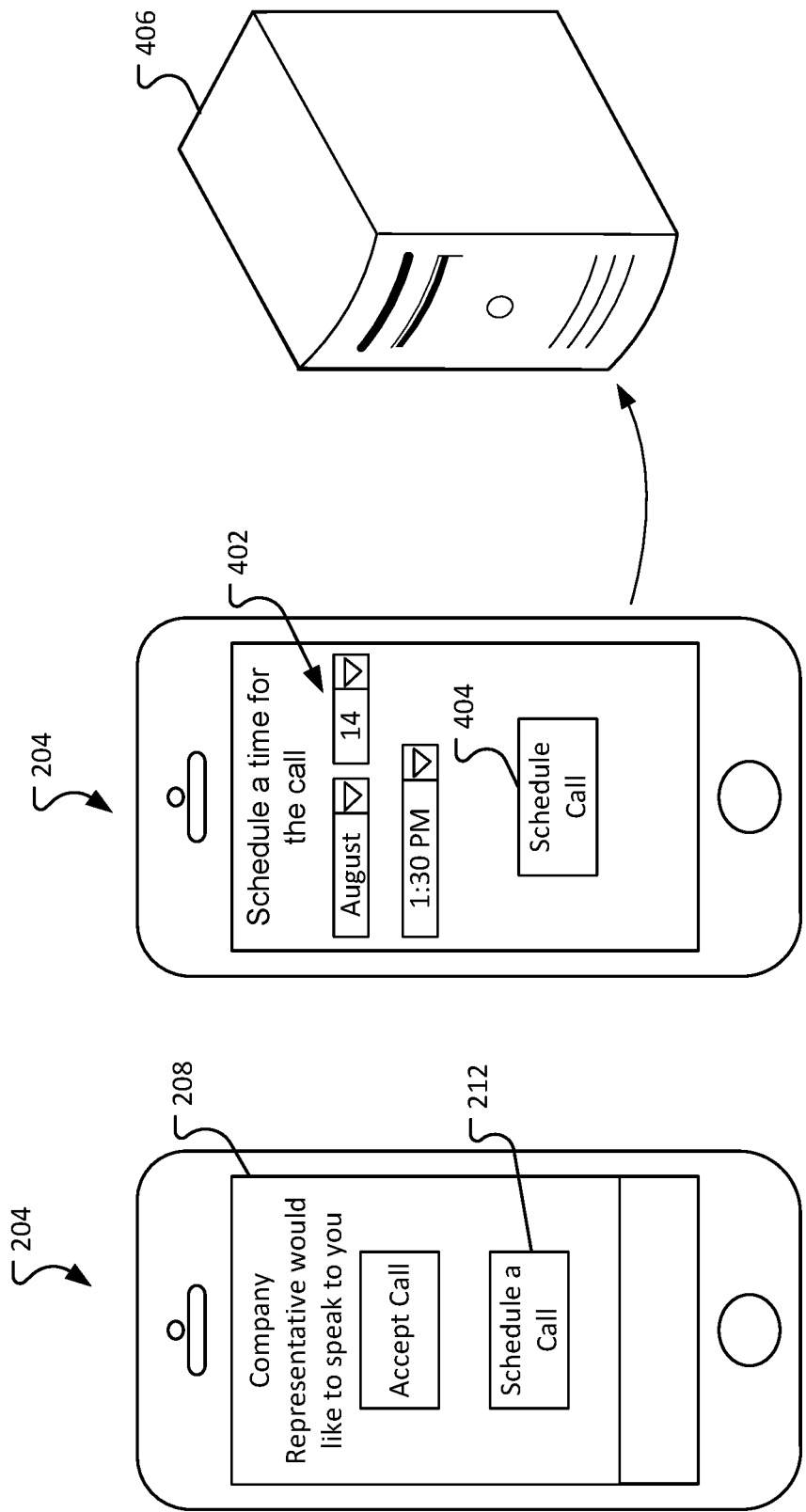
FIGS. 4A-B illustrate an example of a user scheduling a telephone call based on a received notification.

FIGS. 4A-B illustrate an example of a user scheduling a telephone call based on a received notification. Referring to FIG. 4A, as described above, the customer receives the notification 208 on the smart device 204. In this example, the customer elects to schedule a follow up call for a later time, for example, by pressing the button 212.

Referring to FIG. 4B, the smart device 204 of the user presents a user interface that enables the user to schedule a date and time of a follow up phone call. The customer selects a date and time and selects schedule call. In some implementations, the customer may provide additional information to the representative, for example, a note that informs the representative that the customer is free weekdays after 6.

In some implementations, the scheduled call information is capable of being stored in the user's smart device 204, for example, as a calendar entry 402, a reminder, or as information to enable the smart device to automatically send a notification to the user when it is time for the call. The smart device 204 can send the date and time information to a call center computer 406. In some implementations, the information sent to the call center computer 406 also includes information sufficient to identify the customer and the purpose for the call.

In some implementations, the customer is capable of selecting a "remind me later" icon or a similar action that causes the notification 208 to be saved on the smart device 204 and redisplayed at a later time (for example, 30 minutes, an hour, a day, etc.).

In some implementations, if the customer elects to postpone the call, or otherwise does not respond to the notification within a predetermined period of time, then the representative is notified and is able to move on to helping the next customer.

Figure 5:
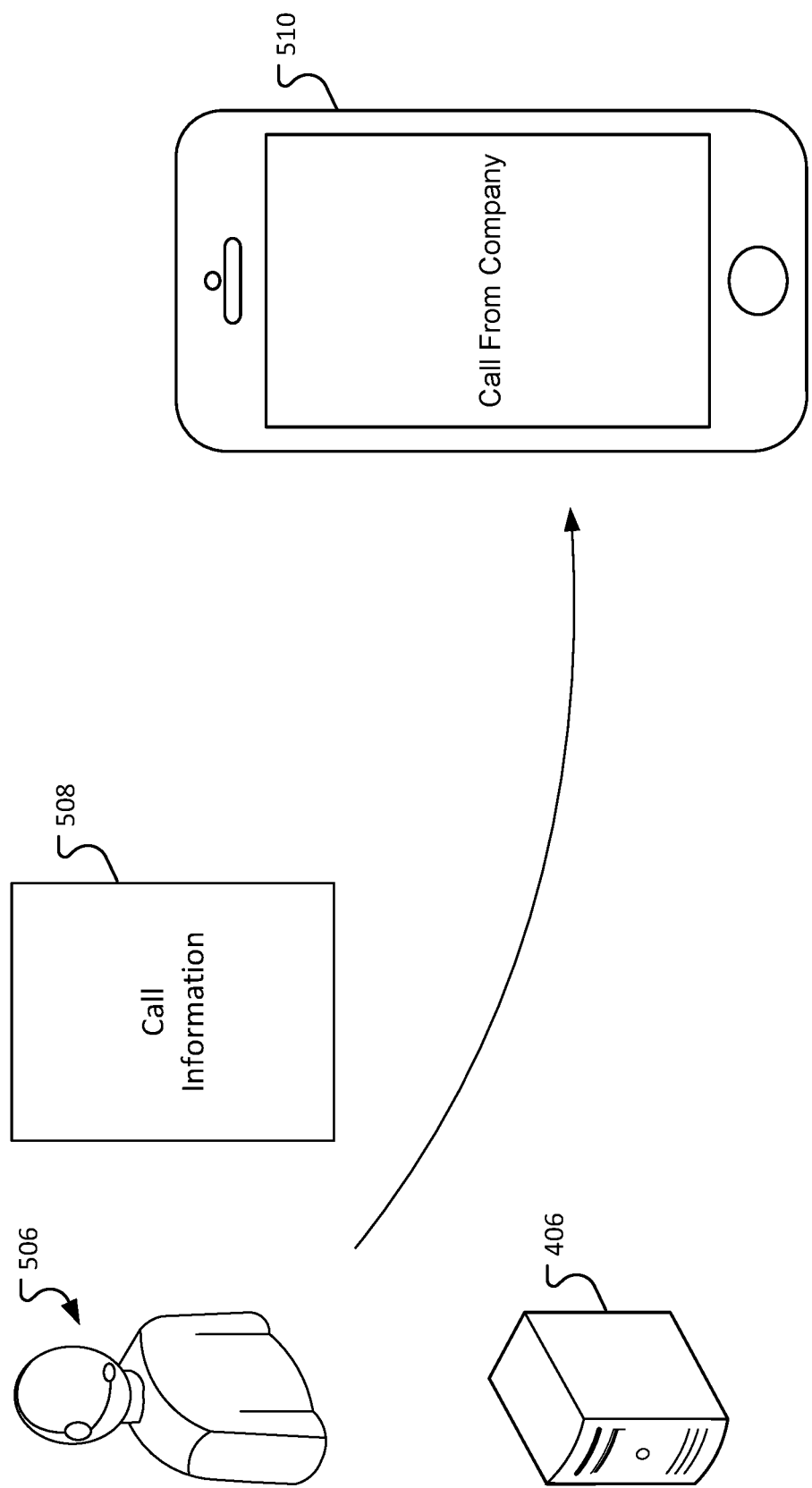
FIG. 5 illustrates an example of a representative contacting a customer at a scheduled time.

FIG. 5 illustrates an example of a representative contacting a customer at a scheduled time. The computer system 406 notifies a representative 506 that it is time to call the customer. The notification can include information that describes the reason for the call 508. When the representative is ready, the representative can call the customer's smart device 510.

In some implementations, the call to the customer's smart device 204 is another notification, which the user may accept or postpone as described above with respect to the initial call. Having the representative 506 call the customer has the advantage that the representative 506 has read about the customers issue and is ready to talk to the customer when the customer answers, but can, however, lead to lost time if the customer pushes the call off (via the notifications, as discussed above.).

Figure 6C:
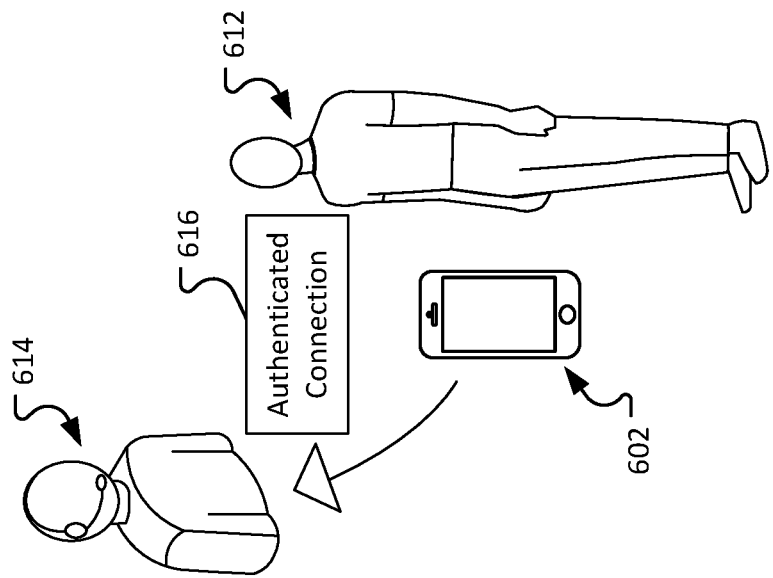
FIGS. 6A-C illustrate an example of a customer calling the representative at the scheduled time.
Figure 6B:
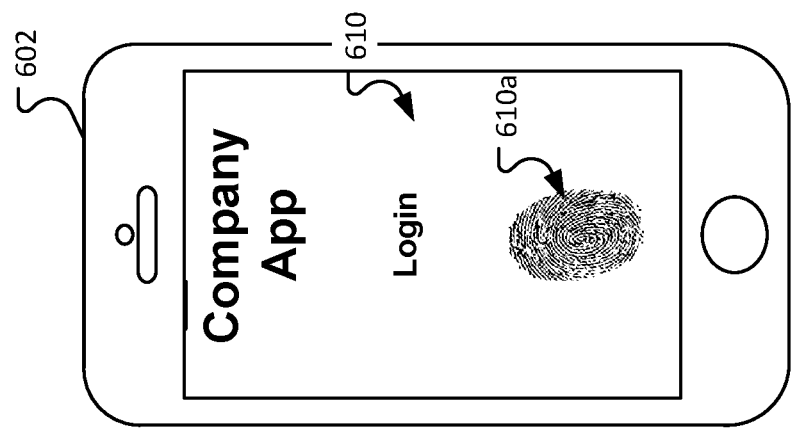
Figure 6A:
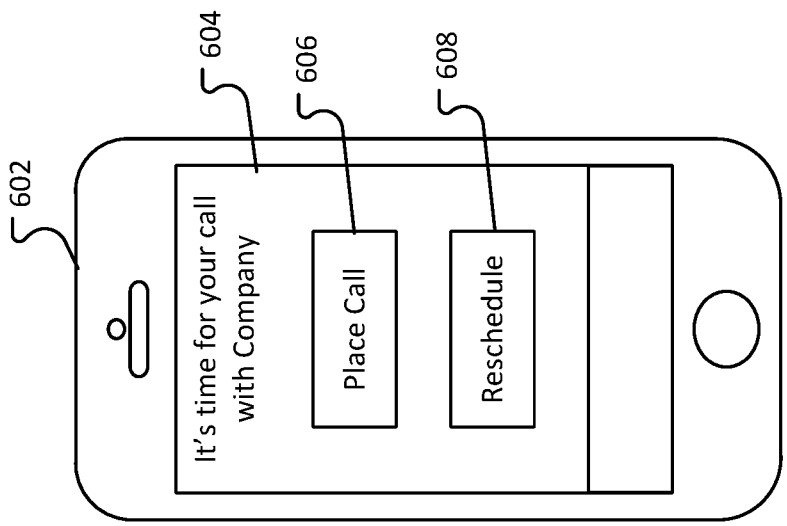

FIGS. 6A-C illustrate an example of a customer calling the representative at a scheduled time.

Referring to FIG. 6A, when it is time for the customer to call the representative, as scheduled by the customer, the smart device 602 of the customer provides a notification 604 on the user interface of the smart device 602. The user interface of the smart device 602 provides the customer with the option to place a call 606 or to reschedule the call 608.

Referring to FIG. 6B, in response to the customer selecting the place call button 606, the user interface of an app (such as the app associated with the company) on of the smart device 602 displays an authentication screen 610. In this example, the authentication screen 610 requests a biometric 610a (e.g., a finger print). As described above, other forms of authentication can also be used, for example, the system can authenticate the customer using facial recognition or other biometrics. The system can also authenticate the customer using a username and password, pin code, or other similar mechanism.

Referring to FIG. 6C, once the customer 612 is authenticated, the smart device 602 may place a call to the representative 614 waiting for the customer's call. Thus, a communications channel between the smart device 602 and the representative 614 (e.g., a computer system, telephone, etc.) is established. Because the customer 612 has already been authenticated by the application of the smart device 602, the customer may be pre-authenticated 616 for the communication with the representative 614. In this manner, the representative 614 does not need to ask the customer 612 additional questions to verify his identity. As described above, the call information may be provided to the smart device 602 as part of the original notification. Alternatively, an application executing on the smart device 602 may contact the call center (for example, using a secure connection over a wireless network) to obtain the call information for the representative, for example, by providing the incident report id and receiving the phone number in exchange.

Figure 7:
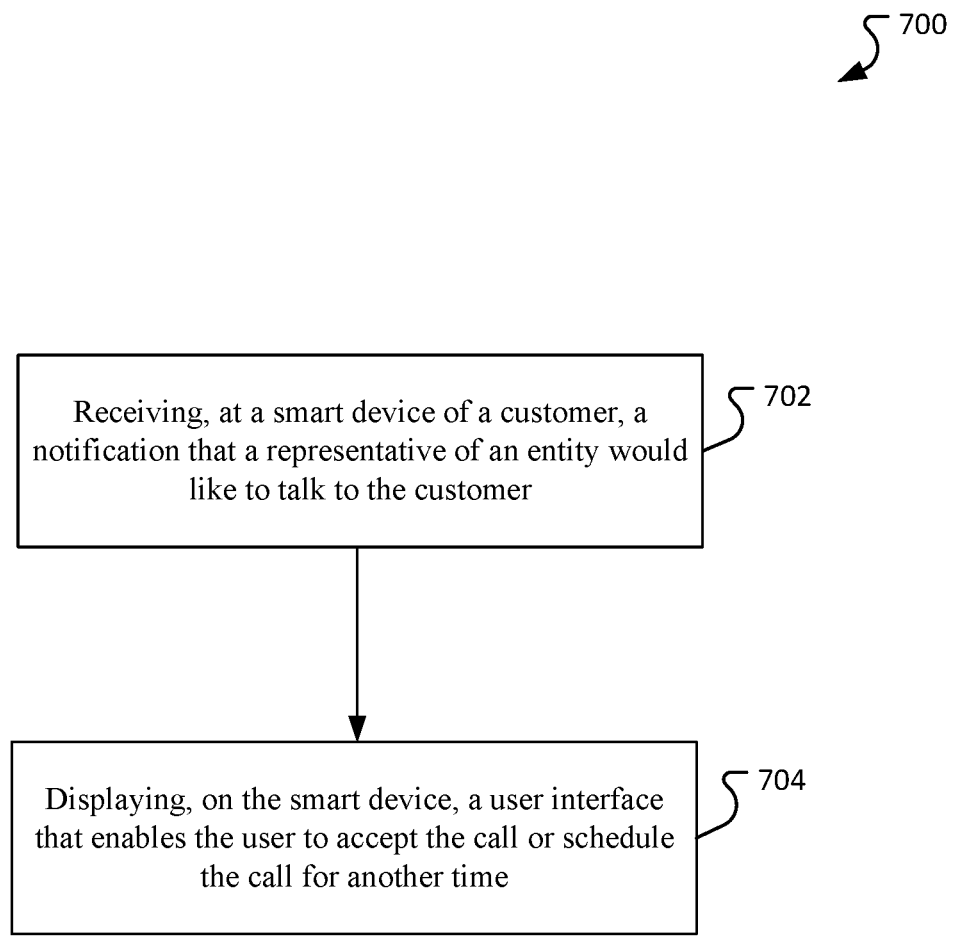
FIG. 7 is a flowchart of a process for customer communication.

FIG. 7 is a flowchart 700 of a process for customer communication.

The process includes receiving (block 702), on a smart device of a customer, a notification that a representative of an entity would like to talk to the customer; and The process includes displaying (block 704), on the smart device, a user interface that enables the user to accept the call or schedule the call for another time.

Figure 8:
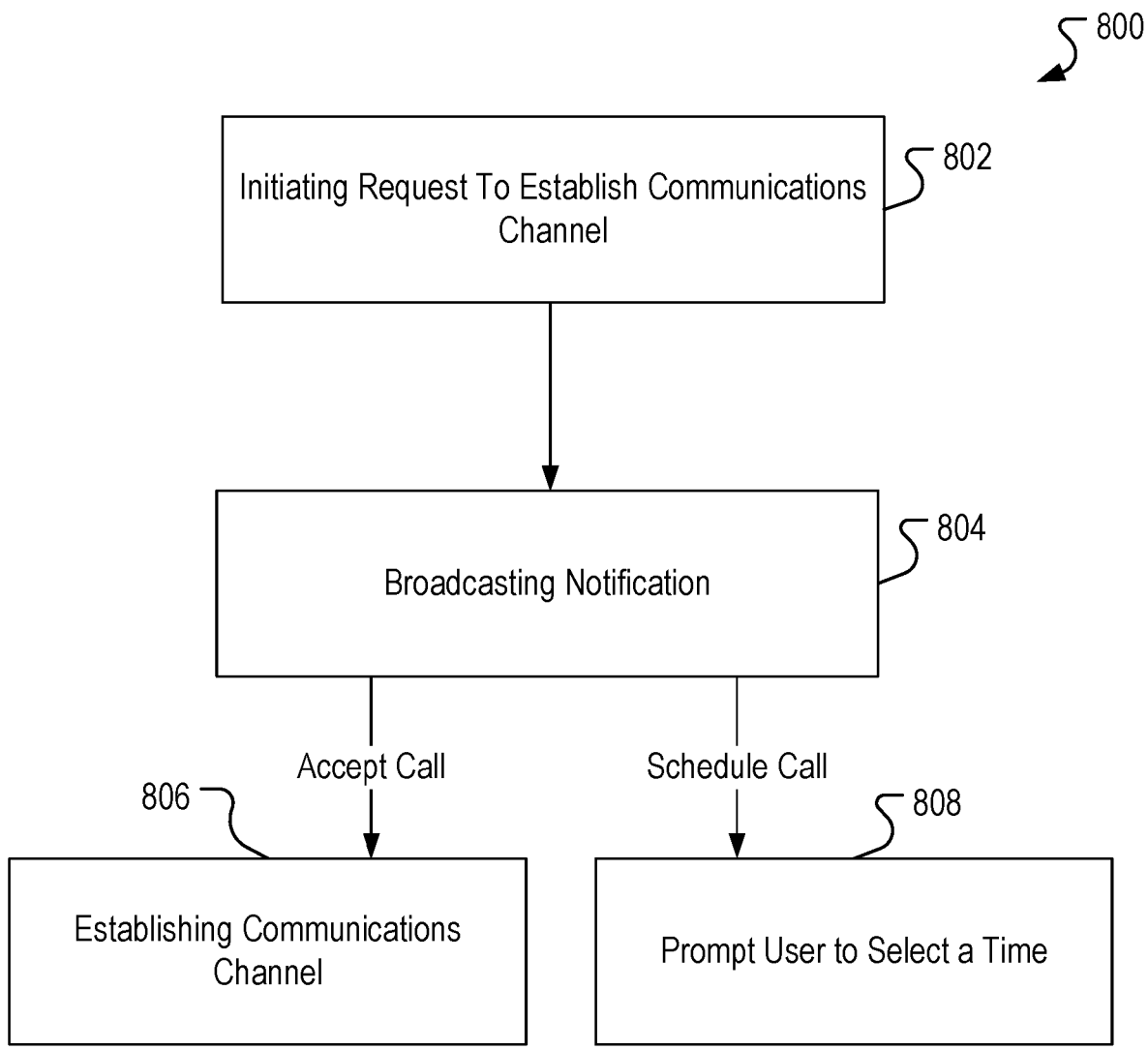
FIG. 8 is a flowchart depicting a method for managing communications channels between systems.

FIG. 8 is a flowchart 800 depicting a method for managing communications channels between systems. The method includes initiating a request to establish a communications channel (block 802), broadcasting a notification (block 804), establishing a communications channel (block 806) and prompting a user to select a time (block 808).

At block 802, a representative (e.g., a customer service representative) causes a computer system (or phone) to initiate a request to establish a communications channel between the computer system and a client device of a user (e.g., customer). In some implementations, the communications channel is a VOIP communications channel.

At block 804, in response to the initiation of the request, a notification is broadcasted to the client device. In some implementations, the notification is a push notification. In some implementations, the notification is broadcasted to a mobile application ("app") on the client device. The app can be executing on the mobile device in the foreground or background state. When the notification is received by the client device, the notification causes the client device to render a graphical user interface with a first visual representation and a second visual representation. The first visual representation prompts the user to accept the request to establish the communications channel. In some implementations, the first visual representation is the accept call icon 210 discussed previously with reference to FIG. 2. The second visual representation prompts the user to schedule the establishing of the communications channel for another time. In some implementations, the second visual representation is the schedule a call icon 212 discussed previously with reference to FIG. 2. The graphical user interface prompts the user to select the first or second visual representation.

At block 806, when the computer system receives selection data specifying that the user of the client device has selected the first visual representation (e.g., accept call button), the communications channel between the computer system and the client device is established. In some implementations, before or during the establishment of the communications channel, the client device authenticates the user of the client device. In some implementations, the client device (e.g., the app on the client device) prompts the user to submit one or more types of biometric data (e.g., fingerprint, facial features, ocular features, etc.).

At block 808, when the computer system receives selection data specifying that the user of the client device selects the second visual representation (e.g., schedule a call icon), one or more third visual representations are caused to display on the client device. The one or more third visual representations prompt the user of the client device to select a time to schedule the establishing of the communications channel. In some implementations, the one or more third visual representations include the calendar entry 402 discussed earlier with reference to FIG. 4B.

In some implementations, if the user of the client device does not select at least one of the first visual representation or the second visual representation within a response time threshold (e.g., 5 minutes, 10 minutes, etc.), then a second notification is broadcast to the client device. When the client device receives the second notification, the client device does not allow the user to select the first visual representation. In some implementations, upon receiving the second notification, the client device does not allow the user to select the second visual representation.

Figure 9:
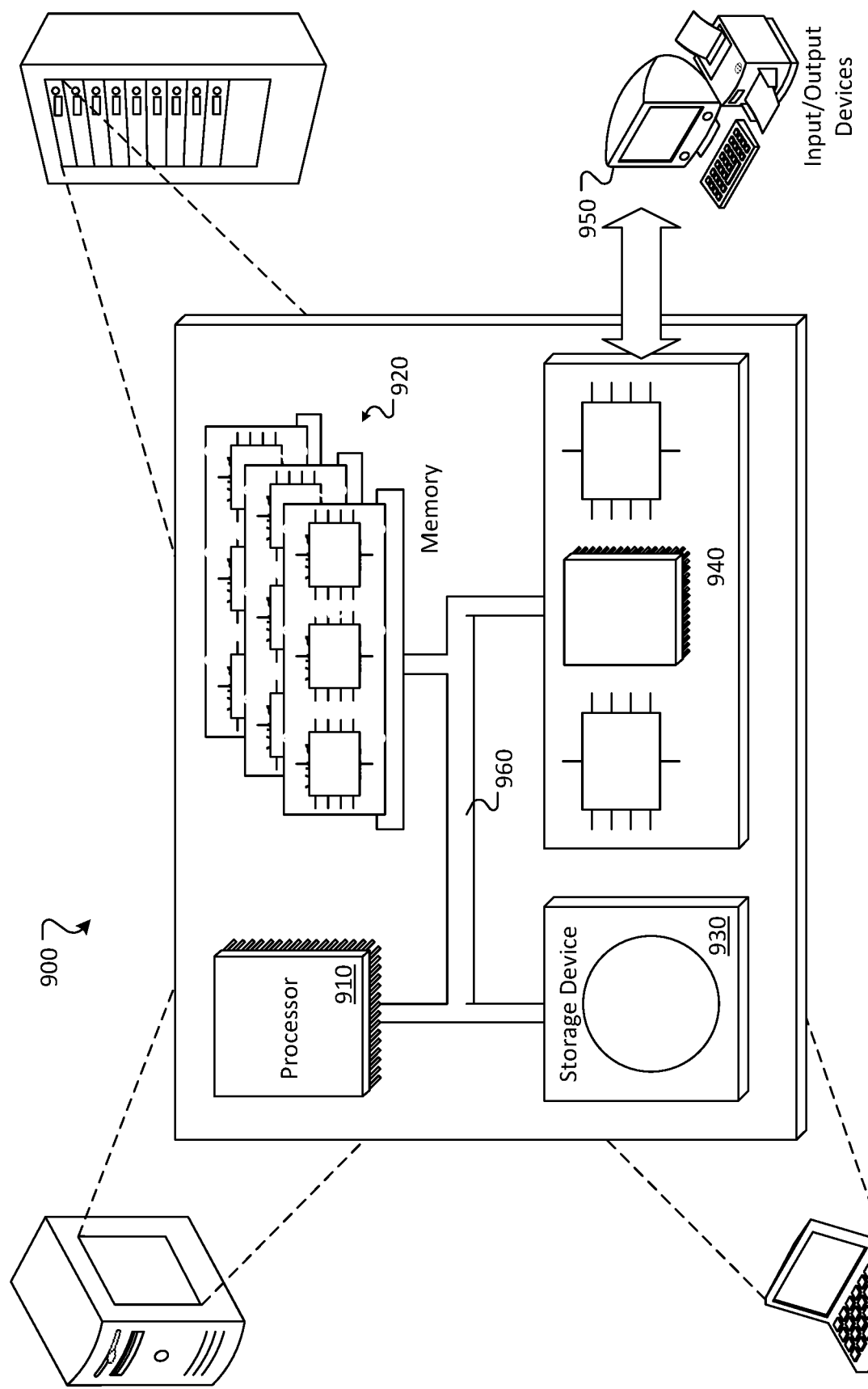
FIG. 9 depicts an example computing system, according to implementations of the present disclosure.

FIG. 9 depicts an example computing system, according to implementations of the present disclosure. The system 900 may be used for any of the operations described with respect to the various implementations discussed herein. The system 900 may include one or more processors 910, a memory 920, one or more storage devices 930, and one or more input/output (I/O) devices 950 controllable through one or more I/O interfaces 940. The various components 910, 920, 930, 940, or 950 may be interconnected through at least one system bus 960, which may enable the transfer of data between the various modules and components of the system 900.

The processor(s) 910 may be configured to process instructions for execution within the system 900. The processor(s) 910 may include single-threaded processor(s), multi-threaded processor(s), or both. The processor(s) 910 may be configured to process instructions stored in the memory 920 or on the storage device(s) 930. The processor(s) 910 may include hardware-based processor(s) each including one or more cores. The processor(s) 910 may include general purpose processor(s), special purpose processor(s), or both.

The memory 920 may store information within the system 900. In some implementations, the memory 920 includes one or more computer-readable media. The memory 920 may include any number of volatile memory units, any number of non-volatile memory units, or both volatile and non-volatile memory units. The memory 920 may include read-only memory, random access memory, or both. In some examples, the memory 920 may be employed as active or physical memory by one or more executing software modules.

The storage device(s) 930 may be configured to provide (e.g., persistent) mass storage for the system 900. In some implementations, the storage device(s) 930 may include one or more computer-readable media. For example, the storage device(s) 930 may include a floppy disk device, a hard disk device, an optical disk device, or a tape device. The storage device(s) 930 may include read-only memory, random access memory, or both. The storage device(s) 930 may include one or more of an internal hard drive, an external hard drive, or a removable drive.

One or both of the memory 920 or the storage device(s) 930 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 900. In some implementations, the CRSM may include a data store that provides storage of computer-readable instructions or other information in a non-transitory format. The CRSM may be incorporated into the system 900 or may be external with respect to the system 900. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 910 and the memory 920 may be supplemented by, or incorporated into, one or more application-specific integrated circuits (ASICs).

The system 900 may include one or more I/O devices 950. The I/O device(s) 950 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 950 may also include one or more output devices such as a display, LED(s), an audio output device (e.g., a speaker), a printer, a haptic output device, and so forth. The I/O device(s) 950 may be physically incorporated in one or more computing devices of the system 900, or may be external with respect to one or more computing devices of the system 900.

The system 900 may include one or more I/O interfaces 940 to enable components or modules of the system 900 to control, interface with, or otherwise communicate with the I/O device(s) 950. The I/O interface(s) 940 may enable information to be transferred in or out of the system 900, or between components of the system 900, through serial communication, parallel communication, or other types of communication. For example, the I/O interface(s) 940 may comply with a version of the RS-232 standard for serial ports, or with a version of the IEEE 1284 standard for parallel ports. As another example, the I/O interface(s) 940 may be configured to provide a connection over Universal Serial Bus (USB) or Ethernet. In some examples, the I/O interface(s) 940 may be configured to provide a serial connection that is compliant with a version of the IEEE 1394 standard.

The I/O interface(s) 940 may also include one or more network interfaces that enable communications between computing devices in the system 900, or between the system 900 and other network-connected computing systems. The network interface(s) may include one or more network interface controllers (NICs) or other types of transceiver devices configured to send and receive communications over one or more networks using any network protocol.

Computing devices of the system 900 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 900 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read-only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by a computer system, the method comprising:
    initiating, by a computer system of a customer service representative, a request to establish a communications channel between the computer system and a client device of a user;
    broadcasting, in response to the initiation of the request and by the computer system, a notification to the client device that when received by the client device causes the client device to render a graphical user interface with a first visual representation and second visual representation, with the first visual representation prompting the user of the client device to accept the request to establish the communications channel and the second visual representation prompting the user of the client device to schedule the establishment of the communications channel for another time, and with the graphical user interface, when rendered, prompting the user of the client device to select the first or second visual representations, wherein the graphical user interface, when rendered, further includes identification information of the customer service representative and a reference number corresponding with a purpose for the request;
    causing, after the computer system receives selection data specifying that the user of the client device selects the first visual representation, display of one or more fourth visual representations that prompt the user to provide, through the graphical user interface, authentication data of the user;
    authenticating, by the computer system, the user based on the authentication data provided by the user;
    automatically establishing, by the computer system and only after authenticating the user, the communications channel between the computer system and the client device;
    causing, when the computer system receives selection data specifying that the user of the client device selects the second visual representation, display of one or more third visual representations that prompt the user of the client device to select a time in which the establishing of the communications channel is scheduled; and
    after waiting a threshold amount of time for the user of the client device to select at least one of the first visual representation or the second visual representation, broadcasting, by the computer system, a second notification to the client device that, when received by the client device, causes the client device to allow the user to select the second visual representation but prevents selection of the first visual representation.

2. The computer-implemented method of claim 1, wherein broadcasting the notification to the client device comprises broadcasting the notification to a mobile application on the client device.

3. The computer-implemented method of claim 1, further comprising, in response to receiving selection data representing a selected time for scheduling the establishing of the communications channel, causing, at the selected time, display of one or more fifth visual representations that prompt the user to initiate the establishing of the communications channel.

4. The computer-implemented method claim 1, wherein the authentication data comprises one or more types of biometric data.

5. The computer-implemented method of claim 1, wherein the notification is a push notification.

6. The computer-implemented method of claim 1, wherein the communications channel is a voice over internet protocol communications channel.

7. The computer-implemented method of claim 1, wherein:
the graphical user interface includes a third visual representation prompting the user to store the notification on the client device and cause the client device to render the graphical user interface at a later time.

8. A system, comprising:
at least one processor; and
a memory communicatively coupled to the at least one processor, the memory storing computer-executable instructions which, when executed by the at least one processor, cause the at least one processor to perform operations comprising:
initiating a request of a customer service representative to establish a communications channel between the at least one processor and a client device;
broadcasting, in response to the initiation of the request, a notification to the client device that when received by the client device causes the client device to render a graphical user interface with a first visual representation and second visual representation, with the first visual representation prompting the user of the client device to accept the request to establish the communications channel and the second visual representation prompting the user of the client device to schedule the establishment of the communications channel for another time, and with the first graphical user interface, when rendered, prompting the user of the client device to select the first or second visual representations, wherein the graphical user interface, when rendered, further includes identification information of the customer service representative and a reference number corresponding with a purpose for the request;
causing, after the at least one processor received selection data specifying that the user of the client device selects the first visual representation, display of one or more fourth visual representations that prompt the user to provide, through the graphical user interface, authentication data of the user;
authenticating the user based on the authentication data provided by the user;
automatically establishing, only after authenticating the user, the communications channel between the system and the client device;
causing, when the at least one processor receives selection data specifying that the user of the client device selects the second visual representation, display of one or more third visual representations that prompt the user of the client device to select a time in which the establishing of the communications channel is scheduled; and
after waiting a threshold amount of time for the user of the client device to select at least one of the first visual representation or the second visual representation, broadcasting a second notification to the client device that, when received by the client device, causes the client device to allow the user to select the second visual representation but prevents selection of the first visual representation.

9. The system of claim 8, wherein broadcasting the notification to the client device comprises broadcasting the notification to a mobile application on the client device.

10. The system of claim 8, the operations further comprising, in response to receiving selection data representing a selected time for scheduling the establishing of the communications channel, causing, at the selected time, display of one or more fifth visual representations that prompt the user to initiate the establishing of the communications channel.

11. The system of claim 8, wherein the authentication data comprises one or more types of biometric data.

12. The system of claim 8, wherein:
the graphical user interface includes a third visual representation prompting the user to store the notification on the client device and cause the client device to render the graphical user interface at a later time.

13. The system of claim 8, wherein the notification comprises a push notification.

14. The system of claim 8, wherein the communications channel comprises a voice over internet protocol communications channel.

15. A non-transient computer-readable medium storing instructions which, when executed by at least one processor, cause the at least one processor to perform operations comprising:
initiating a request of a customer service representative to establish a communications channel between the at least one processor and a client device;
broadcasting, in response to the initiation of the request, a notification to the client device that when received by the client device causes the client device to render a graphical user interface with a first visual representation and second visual representation, with the first visual prompting the user of the client device to accept the request to establish the communications channel and the second visual representation prompting the user of the client device to schedule the establishment of the communications channel for another time, and with the graphical user interface, when rendered, prompting the user of the client device to select the first or second visual representations, wherein the graphical user interface, when rendered, further includes identification information of the customer service representative and a reference number corresponding with a purpose for the request;
causing, after the at least one processor received selection data specifying that the user of the client device selects the first visual representation, display of one or more fourth visual representations that prompt the user to provide, through the graphical user interface, authentication data of the user;
authenticating the user based on the authentication data provided by the user;
automatically establishing, only after authenticating the user, the communications channel between the at least one processor and the client device;
causing, when the at least one processor receives selection data specifying that the user of the client device selects the second visual representation, display of one or more third visual representations that prompt the user of the client device to select a time in which the establishing of the communications channel is scheduled; and
after waiting a threshold amount of time for the user of the client device to select at least one of the first visual representation or the second visual representation, broadcasting a second notification to the client device that, when received by the client device, causes the client device to allow the user to select the second visual representation but prevents selection of the first visual representation.

16. The non-transient computer-readable medium of claim 15, wherein broadcasting the notification to the client device comprises broadcasting the notification to a mobile application on the client device.

17. The non-transient computer-readable medium of claim 15, the operations further comprising, in response to receiving selection data representing a selected time for scheduling the establishing of the communications channel, causing, at the selected time, display of one or more fifth visual representations that prompt the user to initiate the establishing of the communications channel.

18. The non-transient computer-readable medium of claim 15, wherein the authentication data comprises one or more types of biometric data.

19. The non-transient computer-readable medium of claim 15, wherein:
- the graphical user interface includes a third visual representation prompting the user to store the notification on the client device and cause the client device to render the graphical user interface at a later time.

20. The non-transient computer-readable medium of claim 15, wherein the notification comprises a push notification.

\* \* \* \* \*

UNITED STATES PATENT AND TRADEMARK OFFICE
CERTIFICATE OF CORRECTION

| | | |
|---|---|---|
| PATENT NO. | : 10,855,842 B1 | Page 1 of 1 |
| APPLICATION NO. | : 16/367369 | |
| DATED | : December 1, 2020 | |
| INVENTOR(S) | : Robert B. Pace, Jr., Chee Chiang Verzosa Puen, Jr. and Oscar Roberto Tijerina | |

It is certified that error appears in the above-identified patent and that said Letters Patent is hereby corrected as shown below:

In the Claims

Column 12, Line 60, Claim 4, after "method" insert -- of --.

Column 13, Line 27, Claim 8, after "the" delete "first".

Signed and Sealed this
Seventh Day of September, 2021

Drew Hirshfeld
*Performing the Functions and Duties of the
Under Secretary of Commerce for Intellectual Property and
Director of the United States Patent and Trademark Office*